United States Patent
Onoda

(10) Patent No.: US 6,169,544 B1
(45) Date of Patent: Jan. 2, 2001

(54) IMAGE EDIT DEVICE

(75) Inventor: Hitoshi Onoda, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/872,364

(22) Filed: Jun. 10, 1997

(30) Foreign Application Priority Data

Jun. 13, 1996 (JP) .................................................. 8-172815

(51) Int. Cl.[7] .................................................. H04N 1/46
(52) U.S. Cl. .......................................... 345/328; 345/339
(58) Field of Search .................................... 345/326, 327, 345/328, 329, 330, 331–352; 395/117; 358/527, 528, 449, 450, 451

(56) References Cited

U.S. PATENT DOCUMENTS

| | | | |
|---|---|---|---|
| 5,018,083 | * | 5/1991 | Watanabe et al. .................... 364/523 |
| 5,031,121 | * | 7/1991 | Iwai et al. ............................. 364/523 |
| 5,049,933 | * | 9/1991 | Yamada ................................. 355/218 |
| 5,327,265 | * | 7/1994 | McDonald ............................ 358/527 |
| 5,381,523 | * | 1/1995 | Hayashi ................................ 707/513 |
| 5,448,377 | * | 9/1995 | Kinoshita et al. .................... 358/452 |
| 5,530,793 | * | 6/1996 | Watkins et al. ....................... 395/117 |
| 5,577,190 | * | 11/1996 | Peters ................................... 395/501 |
| 5,675,752 | * | 10/1997 | Scott et al. ........................... 395/333 |
| 5,710,954 | * | 1/1998 | Inoue ................................... 396/374 |
| 5,852,503 | * | 12/1998 | Kawaoka .............................. 358/527 |

* cited by examiner

Primary Examiner—Steven Sax
(74) Attorney, Agent, or Firm—Robin, Blecker & Daley

(57) ABSTRACT

An image edit device is used to lay out a plurality of images in one field having a plurality of layout areas with a good balance. The image edit device includes an image input means for reading an image optically recorded on a film, a frame size input means for reading frame size information magnetically recorded on the film, and a layout means for laying out the plurality of images read by the image input means in one field by using the field size information read by the frame size input means.

19 Claims, 10 Drawing Sheets

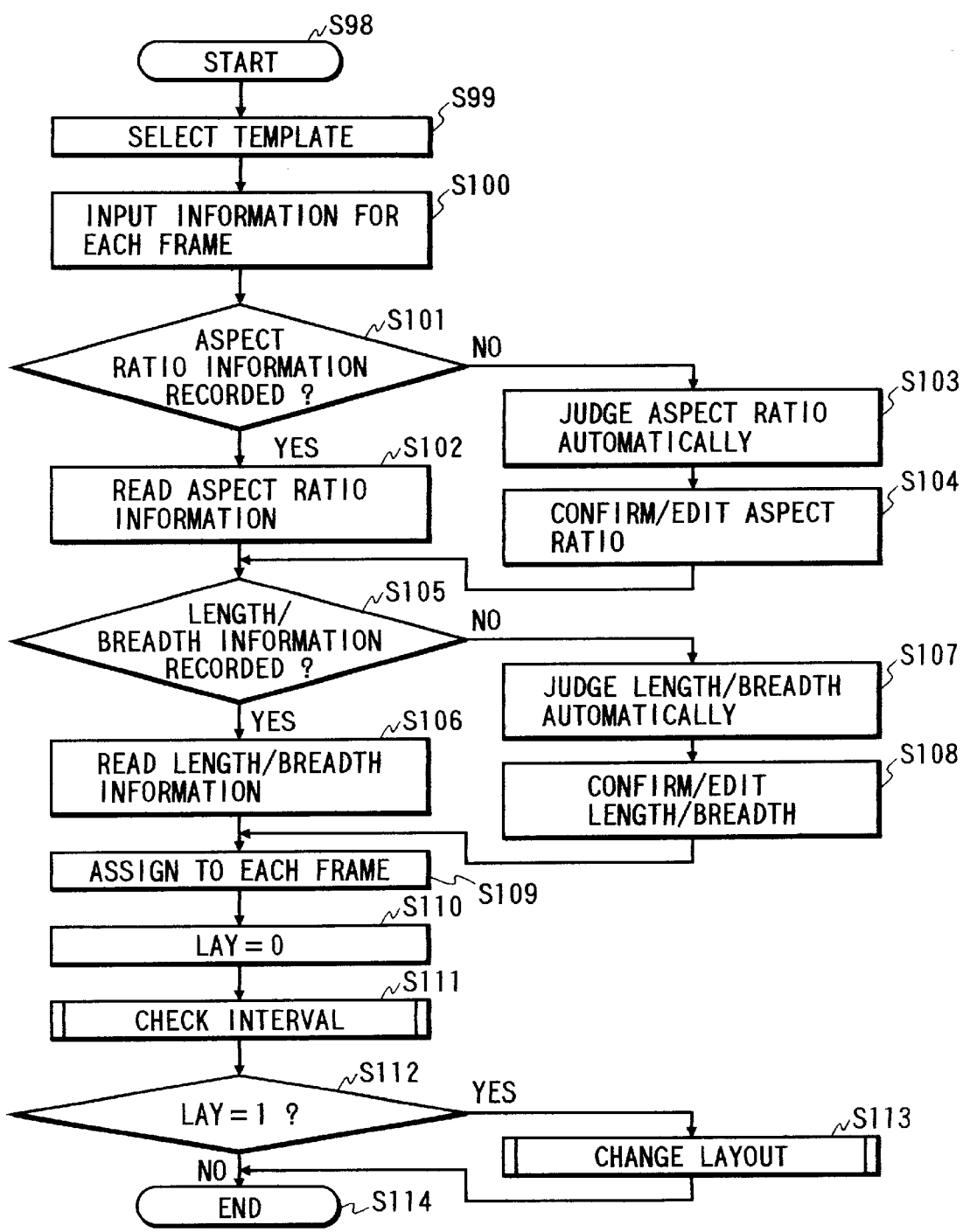

$m_0$ : PREDETERMINED VALUE EXCEEDING 0 (MARGIN)
$m$ : INTERVAL TO THE EDGE OF PRINTABLE AREA AFTER ASSIGNMENT (PRIOR TO LAYOUT CHANGE)

(AFTER LAYOUT CHANGE FOR ONE FRAME)

(PRIOR TO LAYOUT CHANGE)

(AFTER LAYOUT CHANGE FOR ONE FRAME)

IMAGE EDIT DEVICE

BACKGROUND OF THE INVENTION

1. Field of the Invention

The present invention relates to an image edit device for laying out a plurality of image data.

2. Related Background Art

Normally, a photograph is obtained by printing one photographic frame on one sheet of paper. Alternatively, a conventional print layout consisting of a plurality of layout areas shown in FIG. 11 is obtained by laying out a plurality of layout areas 101 to 105 in a printable area 106 of a paper sheet 107, and assigning photographs to the respective layout areas. In this manner, a more impressive multi-print can be obtained by laying out a plurality of photographs on one sheet of paper.

Such a multi-print was difficult to realize by the printing technique of conventional silver salt photography because a high-level technique was required to print a plurality of photographic frames on one print paper sheet at once. At present, with the development of digital image processing techniques and the peripheral equipment, a printout with a multi-frame layout as described above can be easily obtained by converting a photograph into digital data, laying out the data on a computer screen, and printing out the data by a color printer.

The following procedure is performed to provide a service of printing a plurality of photographic frames on one paper sheet by using such digital image processing.

(1) To facilitate acceptance of an order, a plurality of layout information patterns (to be referred to as templates hereinafter) in which the layout positions and sizes of a plurality of photographs on a paper sheet are registered are prepared in advance.

(2) The user selects a desired template, and designates photographic frames to be assigned to the respective layout areas of the selected template.

(3) The photographs are laid out on the basis of the designated template, and printed out by the printer.

In this manner, a plurality of photographs can be easily laid out by preparing a plurality of layout patterns such as a template in advance, and assigning desired photographs to respective layout areas upon selecting a desired template. Each photographic frame has a breadth or length orientation. Further, with recent cartridge films and the like, many trimmed photographs called a panorama-size (P type) photograph or a high-vision-size (H type) photograph with a length-to-breadth ratio (to be referred to as an aspect ratio hereinafter) of breadth 3:length 1 (36 mm:12 mm) or breath 16:length 9 (36 mm:20 mm) are being taken, in addition to a photograph at an aspect ratio of breadth 3:length 2 (36 mm:24 mm) for a normal 35-mm photographic film.

When a photograph (e.g., P or H type) having an aspect ratio different from that set for the template is assigned to a predetermined frame (C type) in the layout print service, an unwanted blank may be generated or the layout balance may be impaired, resulting in a poor print.

A wide print such as a panorama-size photograph is generally obtained by enlarging a photograph at a magnification of enlargement about twice as large as the normal one. When the panorama-size photograph is assigned to a layout area for a plurality of prints, the magnification must be set larger than the normal one. In this case, not only the layout balance may be impaired, but also the photograph may protrude from the printable area of the paper sheet.

When a photograph taken at a length orientation is assigned to a layout area for a photograph taken at a normal breadth orientation, it may protrude from the printable area of the paper sheet.

To eliminate these disadvantages, the present applicant has proposed the following automatic image edit device. In assigning image data to each layout area within the printable area of a paper sheet on the basis of preset layout information, it is necessary for the layout compensation to be checked if the assignment of image data having an aspect ratio is different from that of the layout area designated. If necessary, the layout is automatically compensated.

In this automatic image edit device, to judge the necessity for layout change, the aspect ratio and top-and-bottom direction of the assigned photographic frame must be detected. In this case, the main target is the normal 35-mm film, not the cartridge film having photographing information and film information magnetically recorded on the film surface. In detecting the aspect ratio of the assigned photographic frame, the aspect ratio of breadth 3:length 2, breadth 3:length 1, or breadth 16:length 9 is estimated from the distribution of the exposed surface on the film. Alternatively, the operator manually inputs the aspect ratio.

To detect the top-and-bottom direction, the lightness and hue distributions of the image are examined. If many hue components near blue are detected on one side of the image, this side is supposed to have a sky image, and estimated as the upside of the image. Alternatively, the operator manually inputs the top-and-bottom direction.

In the prior art, the aspect ratio and top-and-bottom direction of the assigned photographic frame are detected by recognizing the image. For this reason, it is difficult to detect the aspect ratio of an underexposed photographic frame from the distribution of the exposed surface, and judgment errors frequently occur. In detecting the top-and-bottom information of an image having no sky image, a detection method using information about the lightness and hue distributions, similar to the above-described method, has no effect, resulting in a detection failure. Even if the top-and-bottom information is detected, detection errors frequently occur.

In the manner of the conventional detection method, automatic detection of the aspect ratio and top-and-bottom direction often leads to a detection error. For this reason, the operator directly inputs the aspect ratio and the top-and-bottom information without performing automatic detection, or confirms upon detection whether the detection result is correct. If the detection result is incorrect, the operator must manually input the aspect ratio and the top-and-bottom direction, resulting in a very cumbersome operation.

SUMMARY OF THE INVENTION

One aspect of this invention is an image edit device in which an image optically recorded on a film is read, and a plurality of images read by image input devices are laid out in one field having a plurality of layout areas by using frame size information magnetically recorded on the film to enable accurate detection of the frame size, thereby realizing a balanced layout.

Another aspect of this invention is an image edit device for reading an image optically recorded on a film and laying out a plurality of images in one field having a plurality of layout areas in accordance with a predetermined template, in which frame size information magnetically recorded on the film is read, and the layout conforming to the template is edited on the basis of the read frame size information, thereby balancing the layout conforming to the predetermined template in correspondence with the frame size of the image.

Another aspect of this invention is an image edit device for editing an image optically recorded on film, in which frame size information magnetically recorded on the film is read, the image magnification of enlargement is determined on the basis of the frame size information, and then a plurality of images enlarged at the magnifications of enlargement determined for respective frame sizes are laid out in one field having a plurality of layout areas, thereby realizing a balanced layout when a plurality of images having different sizes are laid out in one filed having a plurality of layout areas.

BRIEF DESCRIPTION OF THE DRAWINGS

FIG. 2 is a flow chart of the whole operation of the automatic image edit device shown in FIG. 1;

DESCRIPTION OF THE PREFERRED EMBODIMENT

An embodiment of the present invention will be described in detail below with reference to the accompanying drawings.

Figure 1:
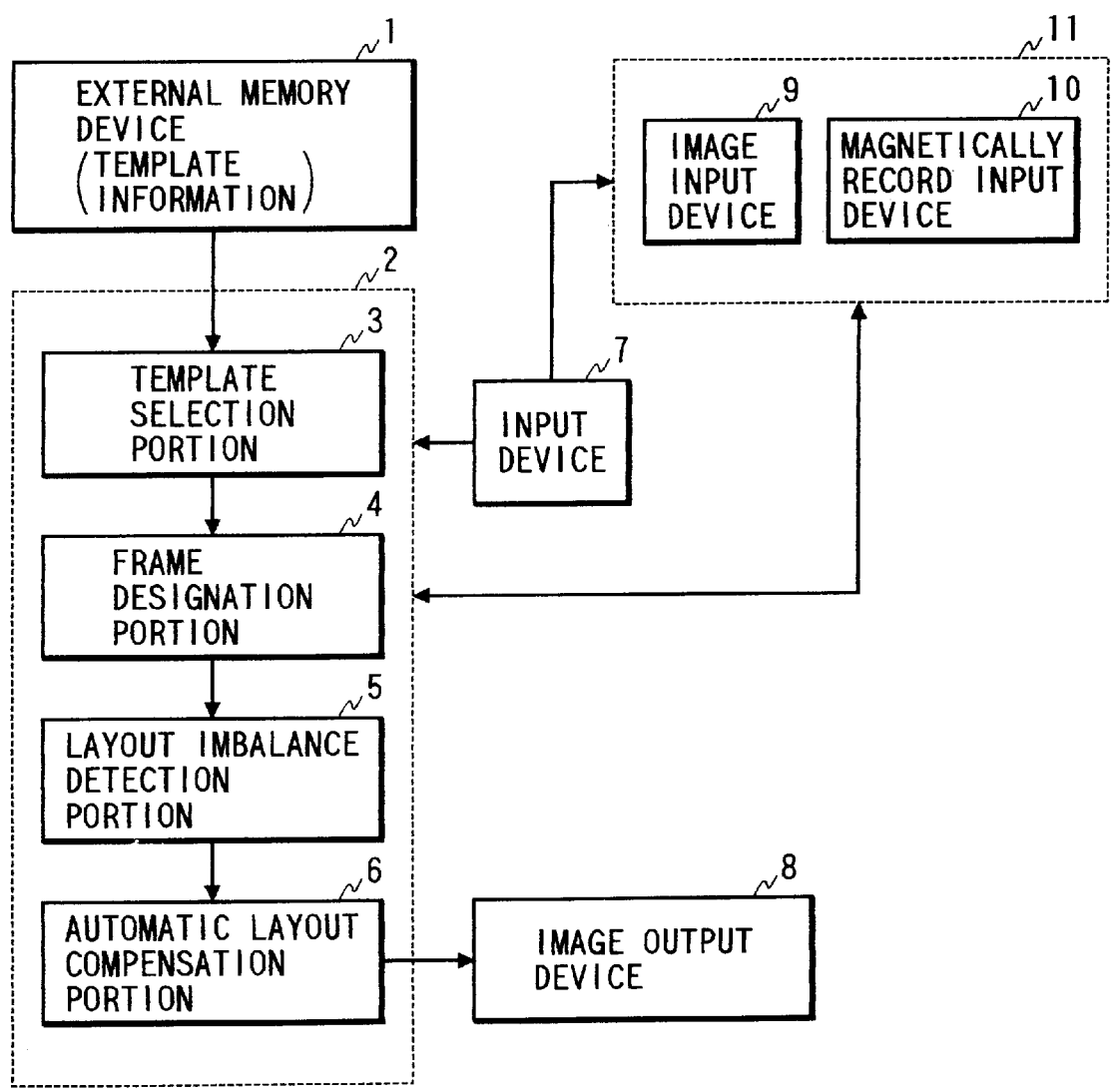
FIG. 1 is a block diagram of an automatic image edit device according to an embodiment of the present invention.

FIG. 1 is a block diagram of an automatic image edit device according to the embodiment of the present invention.

FIG. 2 is a flow chart of the whole operation of the automatic image edit device shown in FIG. 1.

Figure 3A:
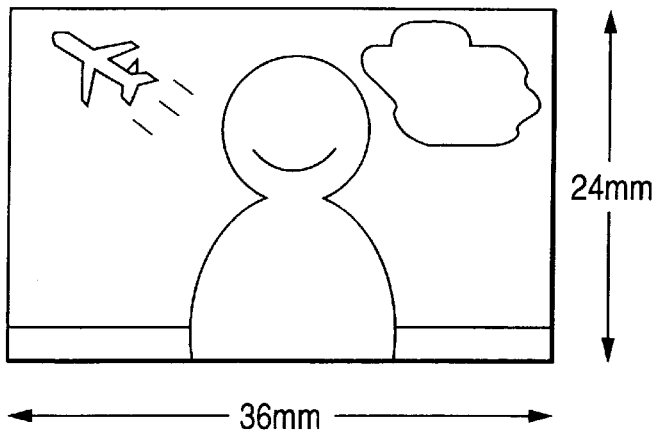
FIGS. 3A, 3B and 3C are views for explaining automatic aspect ratio judgment performed by the automatic image edit device shown in FIG. 1.
Figure 3B:
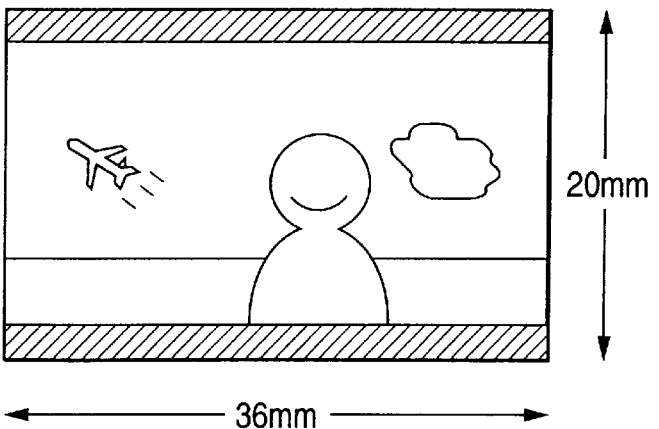
Figure 3C:
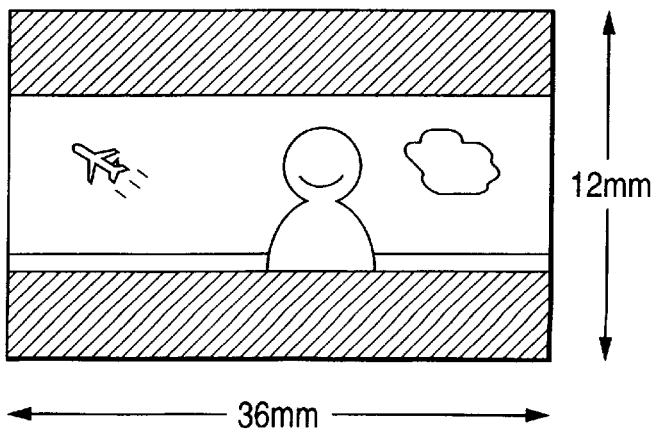

FIGS. 3A, 3B and 3C are views for explaining automatic aspect ratio judgment performed by the device shown in FIG. 1.

Figure 4A:
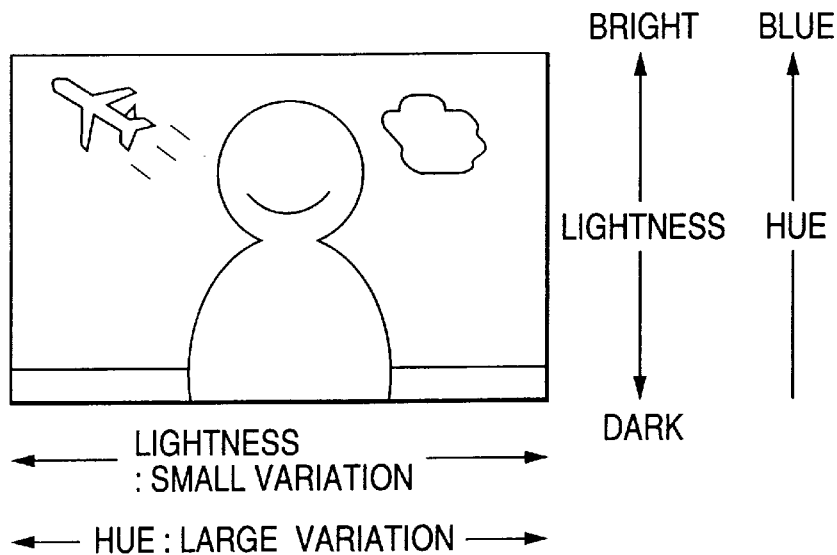
FIGS. 4A and 4B are views for explaining automatic length/breadth position judgment performed by the automatic image edit device shown in FIG. 1.
Figure 4B:
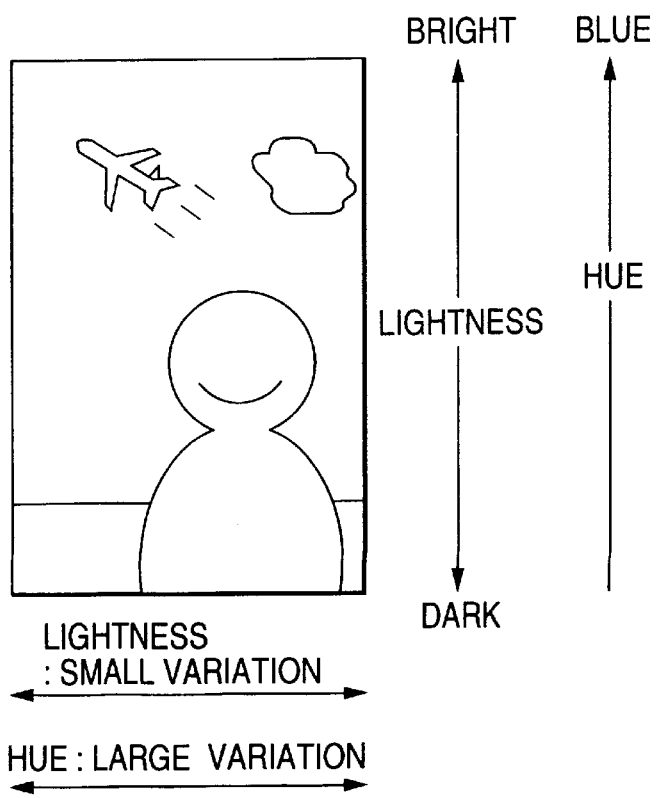

FIGS. 4A and 4B are views for explaining automatic length/breadth position judgment performed by the device shown in FIG. 1.

Figure 5A:
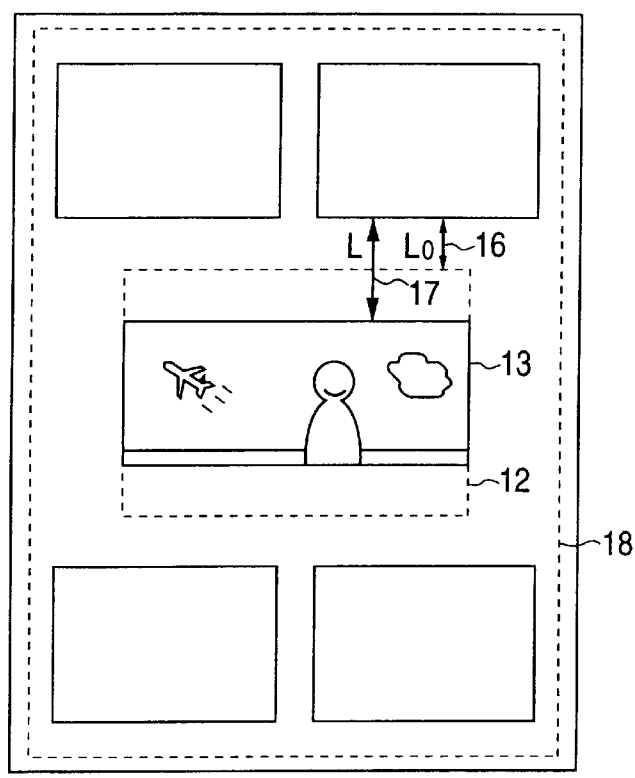
FIGS. 5A and 5B are views for explaining photographic frame assignment and layout change judgment performed by the automatic image edit device shown in FIG. 1.
Figure 5B:
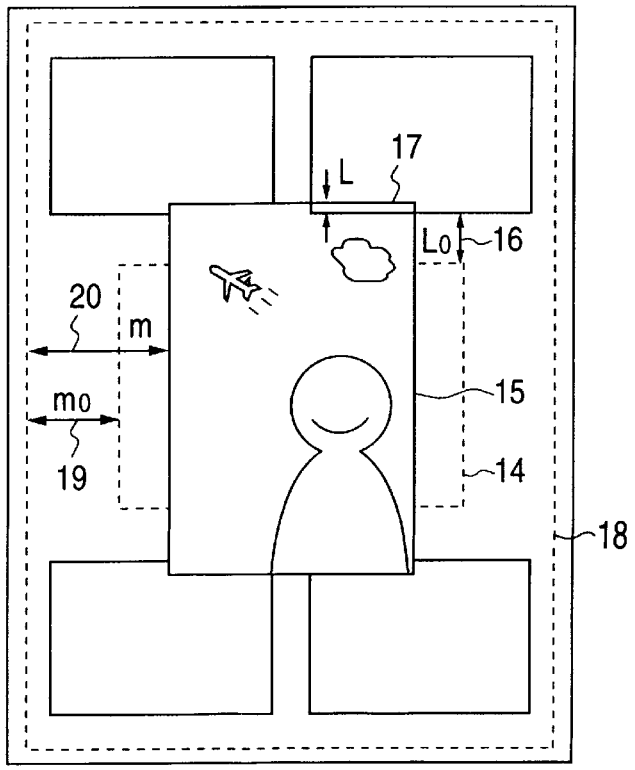

FIGS. 5A and 5B are views for explaining photographic frame assignment and layout change judgment performed by the device shown in FIG. 1.

Figure 11:
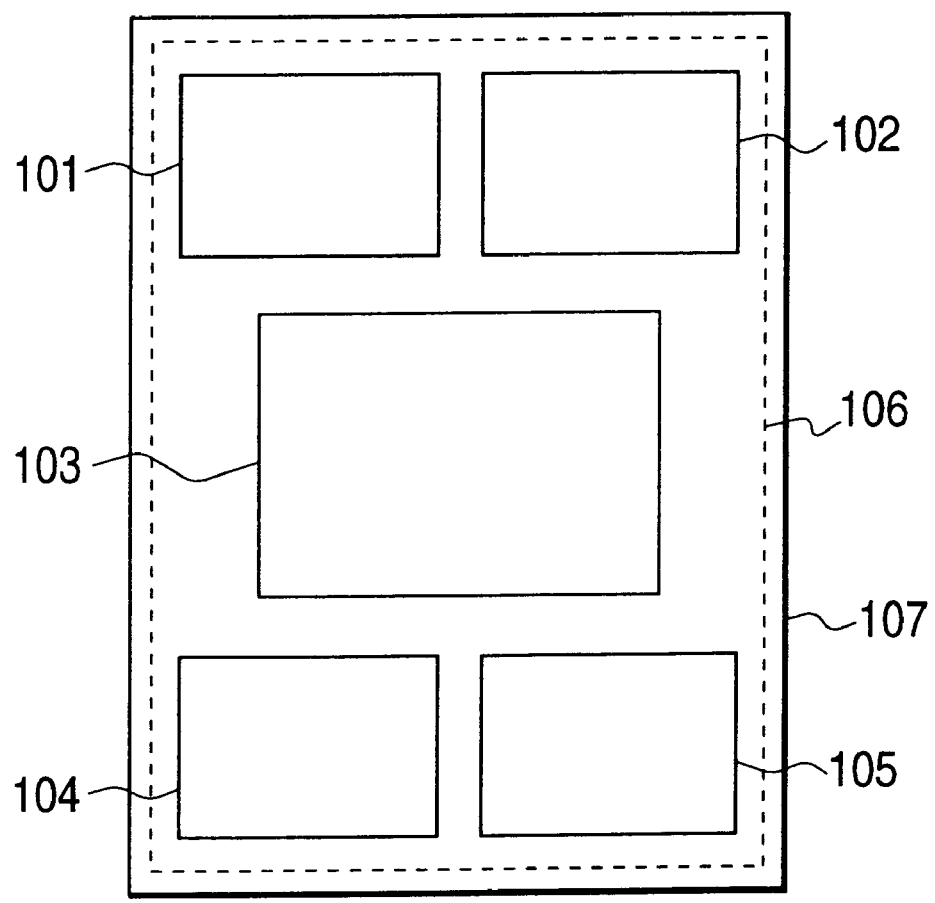
FIG. 11 is a view showing a conventional print on which a plurality of photographic frames are laid out.

Referring to FIG. 1, an external memory device 1 stores and holds a plurality of template information such as a layout shown in FIG. 11. A computer 2 incorporates a template selection portion 3 for selecting a designated template from a plurality of patterns stored in the external memory device 1, a frame designation portion 4 for assigning a photographic frame to each layout area of the selected template, a layout imbalance detection portion 5 for detecting imbalance of the photographic frame assigned to each layout area of template (e.g., whether the photographic frame protrudes in the up-and-down and right-and-left directions of the template frame), and an automatic layout compensation portion 6 for compensating the imbalance detected by the layout imbalance detection portion 5.

An input device 7 is used to input the template information selected by the user and information about the photographic frame assigned to each layout area of the template. An image output device 8 includes a printer for printing images laid out in accordance with the desired template on a paper sheet, a monitor for displaying the image data, and a circuit for outputting the image data as digital data.

An image input unit 11 reads, from a film, the photographic frame information which is input through the input device 7 and assigned to each layout area of template. An image input device 9 reads the photographic frame image which is input through the input device 7 and assigned to each layout area of template. A magnetically record input device 10 reads the magnetic information of the assigned photographic frame image.

The operation will be explained below with reference to FIG. 2 and other drawings.

When information equivalent to the template selected by the user is input to the computer 2 through the input device 7, the following operations from step S99 are performed through step S98 in FIG. 2 by the template selection portion 3, the frame designation portion 4, the layout imbalance detection portion 5, and the automatic layout compensation portion 6.

When the template information is input, a corresponding template is selected from the external memory device 1 (S99). A photographic frame to be assigned to each layout area of the selected template is input through the image input device 9 (S100). The image input device 9 reads the photographic frame information designated by the input device 7, and stores the photograph information (image information and magnetic information) in its internal memory.

It is checked whether the aspect ratio information of the assigned photograph is recorded on the film (S101). For example, in a photographic system using a film cartridge wherein information is recorded on a magnetically recording layer, the aspect information of the photograph is recorded at the magnetically recording portion formed on the film surface. However, the aspect information may not always be recorded in some cameras and films used in photographing, or the magnetic information may fail to be read due to any difficulties.

If it is determined in step S101 that the attribute information is correctly recorded on the film, the aspect ratio information of the photograph to be assigned to the layout area is read (S102). This aspect information is read from the film by the magnetic record input device 10. This aspect information is magnetically recorded in photographing upon being selected by the photographer or in advance in accordance with the specifications of the camera or the like.

If it is determined in step S101 that no magnetic information representing the aspect ratio is recorded on the film, the aspect ratio of the photograph to be assigned to the layout area is automatically determined (S103). When the input source is a general 35-mm silver halide photographic film, the aspect ratio is determined on the basis of the exposure state on the film surface.

For example, when exposure is confirmed on the entire "36 mm×24 mm"-exposed surface, as shown in FIG. 3A, the aspect ratio is determined to be "3:2". If no exposure is confirmed in an area except for the "36 mm×20 mm"-area, as shown in FIG. 3B, or in an area except for the "36 mm×12 mm"-area, as shown in FIG. 3C, the photograph is determined as a high-vision-size or panorama-size photograph respectively.

Since a judgment error may occur in automatic judgment of step S103, for example, the automatically judged aspect ratio is displayed on a monitor (not shown) to cause the operator to confirm it. If the result is incorrect, it is edited in accordance with information given by the operator (S104).

It is checked whether information about the length/breadth direction (top-and-bottom direction) of the photograph to be assigned to the layout area is recorded on the film (S105). For example, in the photograph system using the magnetically recordable film cartridge, the length/breadth information about the four, up-and-down and right-and-left directions in accordance with the camera posture in photographing is recorded as the length/breadth information of the photograph at the magnetically recording portion formed on the film surface. However, the length/breadth information may not always be recorded in some cameras and films used in photographing, or the magnetic information may fail to be read due to difficulties.

If it is determined in step S105 that the attribute information is correctly recorded on the film, the length/breadth direction (top-and-bottom direction) information of the photograph to be assigned is read (S106). This top-and-bottom direction information is information read from the film by the magnetically record input device 10. This information is magnetically recorded when the photographer performs photographing for this photographic frame.

If it is determined in step S105 that no magnetic information representing the top-and-bottom direction is recorded on the film, it is checked on the basis of the photographed scene state of the image whether the photograph is taken at a breadth or length photographing position (S107). Several judgment algorithms can be employed. For example, in many cases, the hue and lightness distribution tendencies in the image change depending on the length or breadth position, as shown in FIGS. 4A and 4B. Using this property, when one side of the image is bright or has many hue components near blue, it is determined as the upside to judge the length or breadth position. Alternatively, the target object may be recognized by an advanced image recognition technique to judge the length or breadth position.

Since a judgment error may occur in automatic judgment of step S107, for example, the automatic judgment result is displayed on the monitor to cause the operator to confirm it. If the result is incorrect, it is edited in accordance with information given by the operator (S108).

The photograph is assigned to the frame on the basis of the determined aspect ratio and top-and-bottom direction information (S109).

In assignment, when a photograph 13 cut at the up and down portions such as a panorama-size photograph is assigned to a set layout area 12 indicated by a dotted line in FIG. 5A, blanks are made at the up and down portions of the layout area 12, resulting in an imbalance layout as a whole. In this case, the same magnification is used for panorama-size and normal-size prints. If the magnification of enlargement for the panorama-size print is set larger than that for the normal-size one, a wide print can be formed. This method is also effective and general in a layout print. The magnification for the panorama print is, e.g., doubled in advance. When a panorama-size photographic frame is assigned to a normal template layout area, it is enlarged at the magnification for the panorama-size print. Even if such assignment is performed, the same layout imbalance detection and edit operations are performed.

When a photograph 15 taken at the length position is assigned to a set layout area 14 indicated by a dotted line in FIG. 5B, it undesirably protrudes from the layout area in the up and down directions to overlap other photographic frames. Further, a photograph may be laid out, while protruding from a printable area 18 due to an incorrect length/breadth position.

For this reason, necessity for a layout change is judged. First, a layout change flag "lay" is reset to "0" (S110). The up, down, right, and left intervals of the assigned photographic frame are checked (S111).

Figure 6:
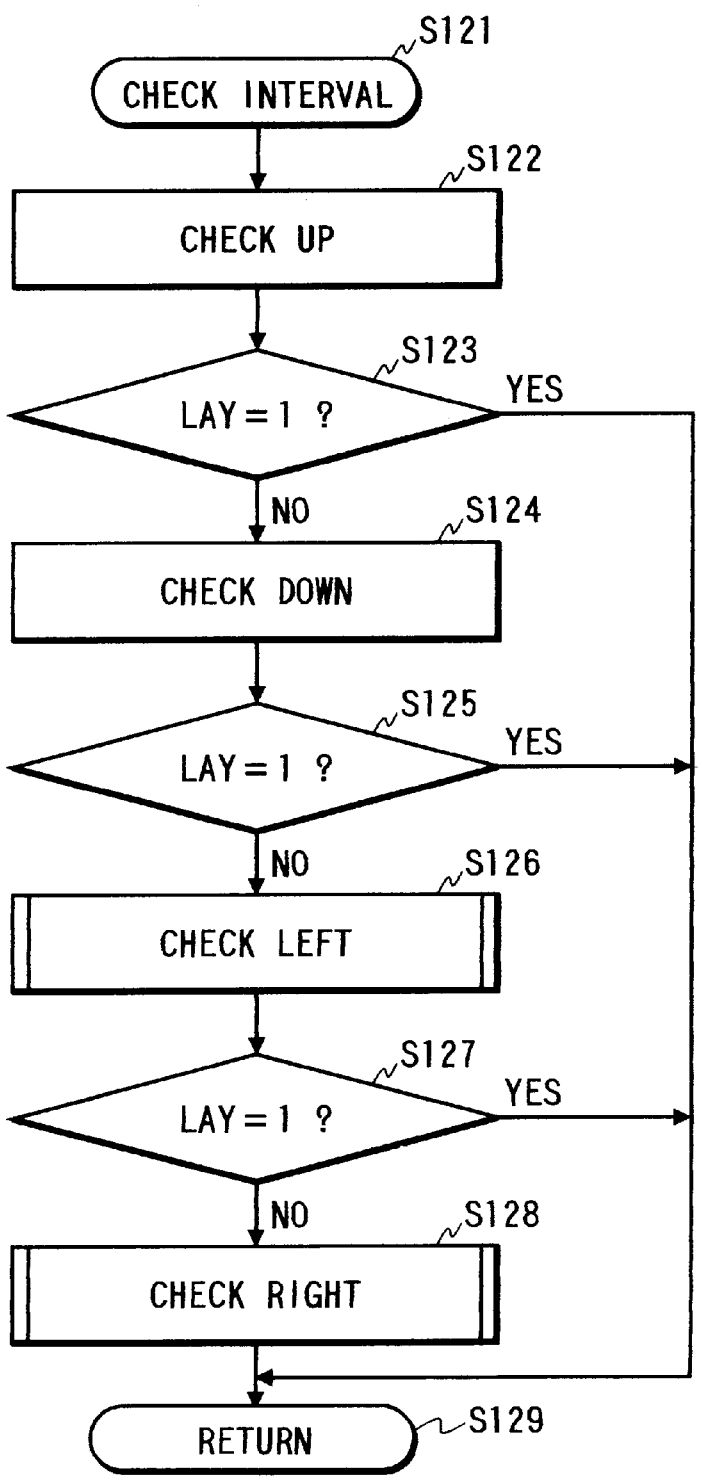
FIG. 6 is a flow chart of the subroutine of the interval check operation in the flow chart shown in FIG. 2.
Figure 7:
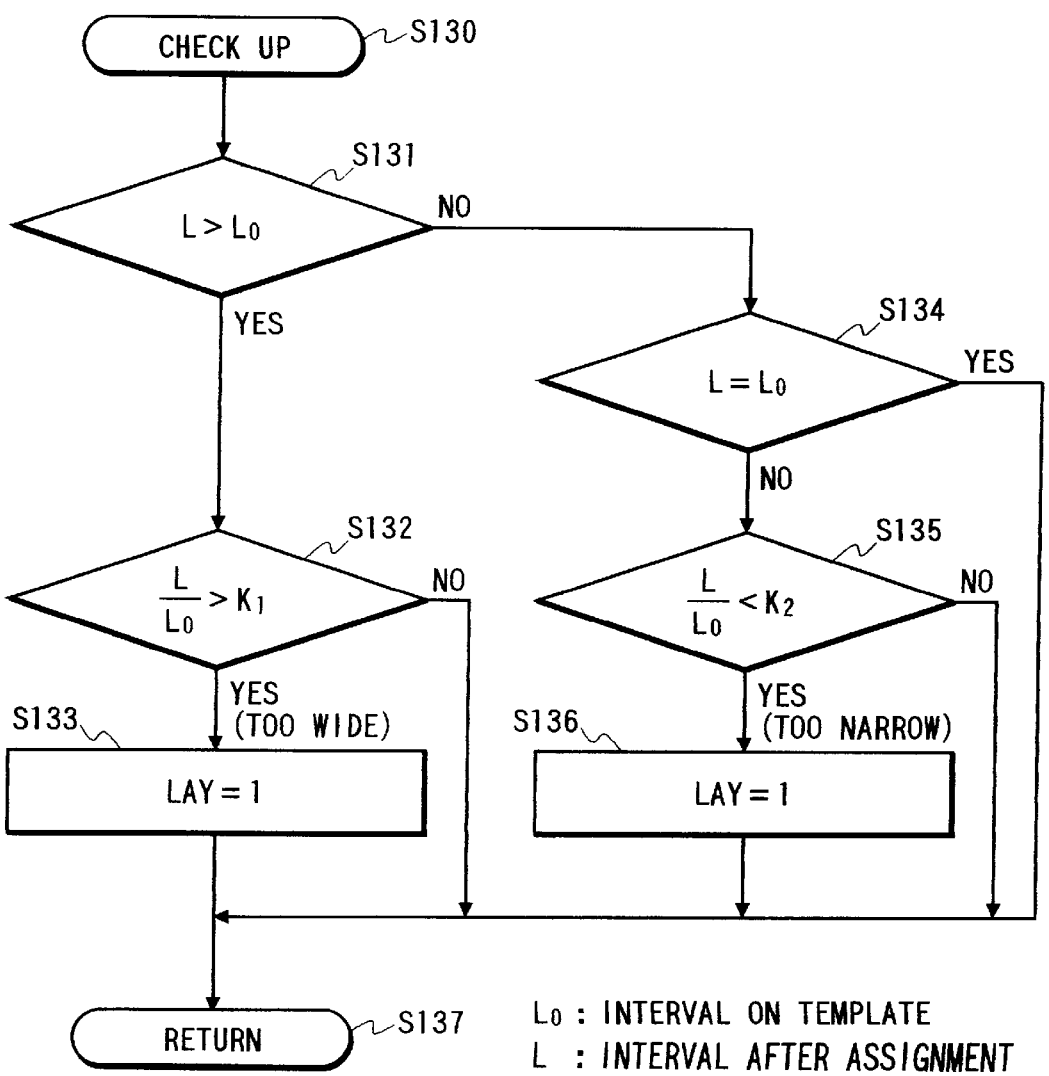
FIG. 7 is a flow chart of the subroutine of the up check operation in the flow chart shown in FIG. 6.

FIG. 6 shows the subroutine of the interval check operation in the flow chart shown in FIG. 2. FIG. 7 shows the subroutine of the up check operation in the flow chart shown in FIG. 6. When the "check interval" subroutine in FIG. 6 is called, the operation starts from step S122 through step S121 of FIG. 6.

First, an upper interval is checked (S122). At this time, the "check up" subroutine in FIG. 7 is called (S130). The "check up" subroutine subsequent to step S130 in FIG. 7 will be described in detail below with reference to FIGS. 5A and 5B. An interval $L_o$ 16 in FIG. 5A is an interval between the layout area 12 set in the template and the nearest upper layout area, and an interval L 17 is an interval between the photograph 13 assigned to the layout area 12 and the nearest upper frame.

It is checked whether $L>L_0$, i.e., the assigned photographic frame 13 protrudes from the template layout area 12 in the up direction (S131).

If YES, i.e., the assigned photographic frame 13 does not protrude, the ratio "$L/L_0$" is compared with a predetermined value $K_1$ ($K_1>1$) (S132). If the comparison result is "$L/L_0>K_1$", it is determined that the assigned photographic frame 13 does not protrude in the up direction, but the interval L to the nearest layout area is too wide. The layout change flag "lay" is set to "1" (S133), and the flow returns to the subroutine in FIG. 6 through step S137. If "$L/L_0 \leq K_1$" in step S132, no layout change is required, and the flow immediately returns to the subroutine in FIG. 6 through step S137.

If it is determined in step S131 that $L>L_0$ fails and the assigned photographic frame coincides with or protrudes from the template layout area 12 in the up direction, it is checked whether $L=L_0$ (S134). If YES, the assigned photographic frame coincides with (does not protrude from) the template layout area 12, so no layout change is required. The flow immediately returns to the subroutine in FIG. 6 through step S137.

If $L=L_0$ fails, the ratio "$L/L_0$" is compared with a predetermined value $K_2$ ($K_2<1$) (S135). If the comparison result is "$L/L_0<K_2$", it is determined that the assigned photographic frame 13 largely protrudes in the up direction (the protrusion amount exceeds the allowable range), and that the interval L to the nearest layout area is too narrow. The layout change flag "lay" is set to "1" (S136), and the flow immediately returns to the subroutine in FIG. 6 through step S137.

If "$L/L_0<K_2$" in step S135, it is determined that the assigned photographic frame does not so protrude as to perform a layout change in the up direction. The flow immediately returns to the subroutine in FIG. 6 through step S137.

Upon completion of the "check up" subroutine in FIG. 7 in this manner, the flow returns to FIG. 6 to check whether the layout change flag "lay" is "1" (S123). If YES, the flow returns to this routine through step S129.

If the layout change flag "lay" is "0" in step S123, the "check down" subroutine is executed (S124). That is, an interval between the assigned photographic frame and the lower layout area is checked. This operation is the same as processing using the "check up" subroutine in FIG. 7, and a detailed description thereof will be omitted.

If the layout change flag "lay" is "1" in the "check down" subroutine (S125), the flow returns to this routine through step S129. If the layout change flag "lay" is "0", the left interval of the assigned photographic frame is checked (S126).

Figure 8:
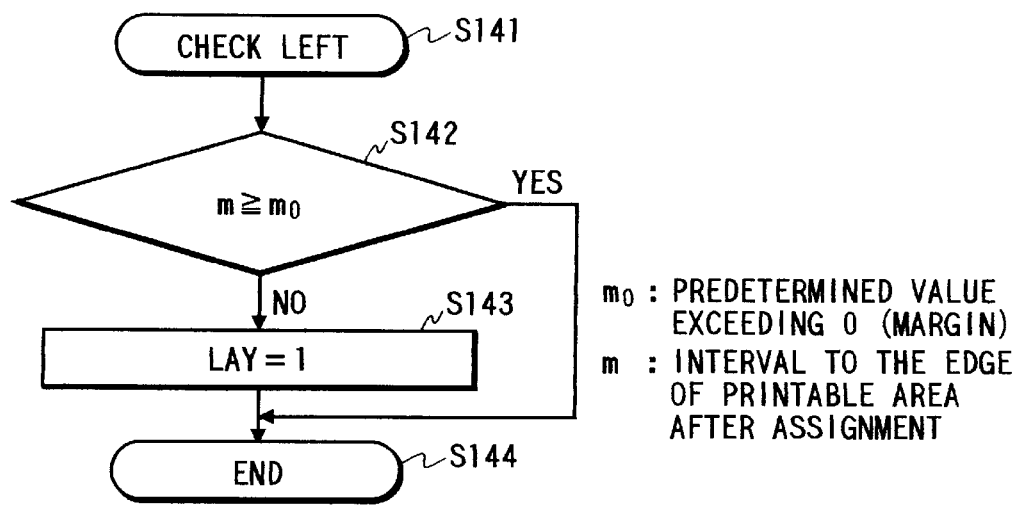
FIG. 8 is a flow chart of the subroutine of the left check operation in the flow chart shown in FIG. 6.

FIG. 8 shows a subroutine of the left check operation in the flow chart shown in FIG. 6. The "check left" operation will be described with reference to the flow chart in FIG. 8 using FIG. 5B. An interval $m_0$ 19 in FIG. 5B is an interval (predetermined value equal to or larger than 0) between the template set layout area 14 and the left edge of a printable area 18, and an interval m 20 is an interval between the assigned photographic frame 15 and the left edge of the printable area 18.

In the "check left" subroutine, it is checked whether "$m \geq m_0$", i.e., the assigned photographic frame 15 protrudes to the printable area 18 in the left direction (S142). If "$m \geq m_0$", the assigned photographic frame 15 does not protrude, and the flow returns to this subroutine through step S144. If "$m<m_0$", the assigned photographic frame 15 may protrude, so that the layout change flag "lay" is set to "1" (S143), and the flow returns to this subroutine through step S144.

The above description is related to the pattern, like the one shown in FIG. 5B, wherein the left and right sides of the assigned photographic frame 15 are within the printable area. For a pattern having the nearest layout area on the left side of the assigned photographic frame 15, like in the up and down sides, the same interval check as the "check up" subroutine in FIG. 7 is performed, as a matter of course.

Referring back to FIG. 6, if the layout change flag "lay" is set to "1" in the above "check left" subroutine (S127), the flow returns to this routine through step S129. If the layout change flag "lay" is "0", the right "interval" check is performed for the assigned photographic frame 15 (S128). The operation is the same as the "check left" subroutine in FIG. 8, and a detailed description thereof will be omitted. For a pattern having the nearest layout area on the right side, the same operation as that of the "check up" subroutine in FIG. 7 is performed, as a matter of course.

Upon completion of the above operations, the "check interval" subroutine in step S111 ends. The above operation is summed up in short. If a photographic frame is present near the assigned photographic frame in the up, down, right, or left area, the ratio of the interval L between the assigned photographic frame and the nearest photographic frame in this direction to the interval $L_0$ between the nearest photographic frame and the template layout area is calculated. This ratio $L/L_0$ is compared with the predetermined value $K_1$ to determine whether to perform a layout change. If there is no near photographic frame, the interval m between the assigned photographic frame and the edge of the printable area is compared with the interval $m_0$ between the edge of the printable area and the template layout area to determine whether to perform the layout change.

When the user wants to originally change the layout such that the interval in the up-and-down direction is set small, while the interval in the right-and-left direction is set large, the user can freely lay out photographic frames by optimally setting the predetermined values $K_1$ and $K_2$ or $m_0$ for the up-and-down and right-and-left directions.

Referring back to the main chart in FIG. 2, whether the layout change flag "lay" is set to "1" is checked upon completion of the "interval check" (S112). If YES, the layout change is executed (S113).

Figure 9:
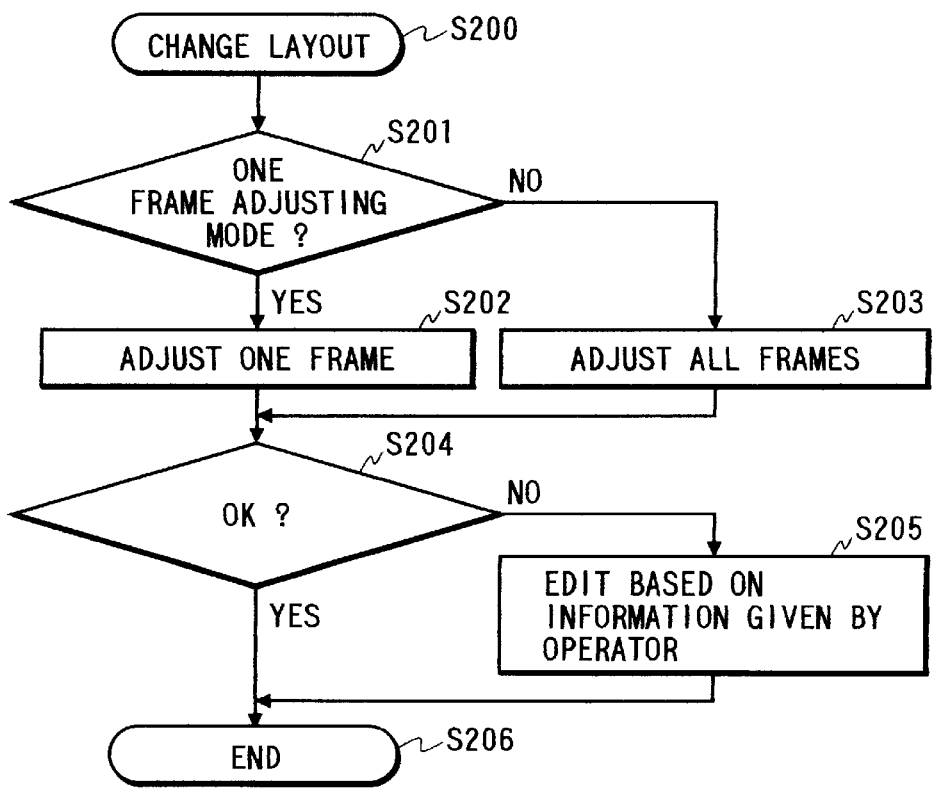
FIG. 9 is a flow chart of the subroutine of the automatic layout change operation in the flow chart shown in FIG. 2.

FIG. 9 shows the subroutine of the layout change operation in the flow chart shown in FIG. 2. FIGS. 10A to 10D are views for explaining the layout change operation in FIG. 9.

The "change layout" algorithm in this case will be explained with reference to the subroutine in FIG. 9.

Although various methods can be used to perform the automatic layout change processing, the present invention will exemplify a case wherein the layout is changed by changing the magnification in the following manner.

First, it is checked whether the change mode is the one layout area adjusting mode or the all layout area adjusting mode (S201). In the one layout area adjusting mode, the size of only one assigned photographic frame is adjusted (S202).

Figure 10A:
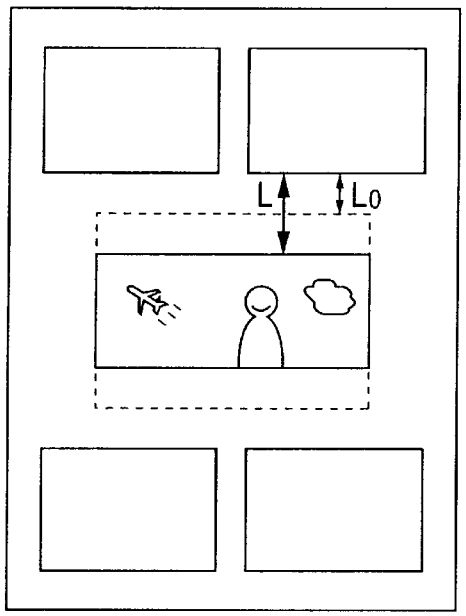
FIGS. 10A, 10B, 10C and 10D are views for explaining the layout change operation shown in FIG. 9.
Figure 10B:
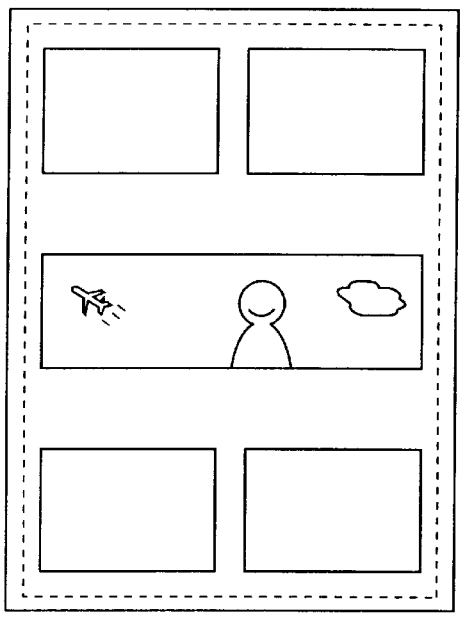

In this mode, the size of only the assigned photographic frame is adjusted to change the layout. For example, when "$L/L_0>K_1$" as in FIG. 10A, the size of the assigned photographic frame is increased. The size is increased until the interval between the assigned photographic frame and the near photographic frame becomes $K_1 \cdot L_0$ (or the layout initial set interval $L_0$). Alternatively, the size is increased to a predetermined value within the printable area, as shown in FIG. 10B.

Figure 10C:
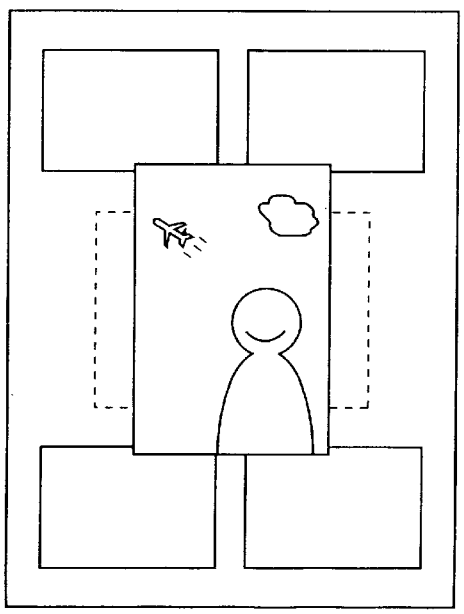
Figure 10D:
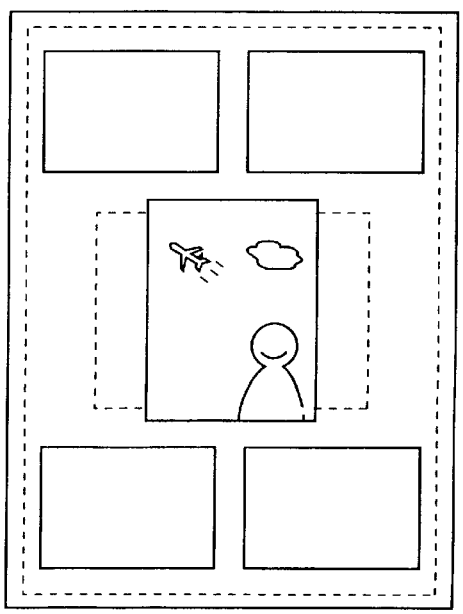

When "$L/L_0<K_2$" as in FIG. 10C, the size of the assigned photographic frame is decreased. The size is decreased until the interval between the assigned photographic frame and the near photographic frame becomes $K_2 \cdot L_0$ (or the layout initial set interval $L_0$), as shown in FIG. 10D. Alternatively, the size is decreased to fall within the printable area without overlapping the near photographic frame.

If the change mode is determined in step S201 to be the all layout area adjusting mode, the sizes of all the layout area are adjusted to change the layout (S203). In this mode, the sizes of all the layout areas are changed to change the layout. For example, when "$L/L_0>K_1$" as in FIG. 10A, the sizes of all the layout areas are increased. Each size is increased until the interval between the photographic frame and the near photographic frame becomes $K_1 \cdot L_0$ (or the layout initial set interval $L_0$). Alternatively, the size is increased to a predetermined value within the printable area, as shown in FIG. 10B.

When "$L/L_0<K_2$" as in FIG. 10C, each frame size is decreased. The size is decreased until the interval between the assigned photographic frame and the near photographic frame becomes $K_2 \cdot L_0$ (or the layout initial set interval $L_0$). Alternatively, the size is decreased to fall within the printable area without overlapping the near photographic frame.

Whether the automatically changed layout is proper is inquired of the operator through the monitor or the like. If an "OK" signal is input through the input device 7 (S204), the "change layout" operation ends (S206). The result is printed out by the image output device 8 in FIG. 1.

When it is determined in step S204 that the automatically changed layout is improper, the layout is edited in accordance with the manual edit performed by the operator (S205) to complete the "change layout" operation (S206). The layout result is printed out by the image output device 8.

According to this embodiment, in a magnetically recordable film cartridge, the aspect ratio and the top-and-bottom direction can be accurately read as magnetic information by using the image input device for reading and detecting, as magnetic information, the attributes such as the aspect ratio and the top-and-bottom direction magnetically recorded on the film. The operator is free from any cumbersome operation, and a print with a balanced layout can be automatically obtained.

In the above-described automatic image edit device, the film attributes such as the aspect ratio and the top-and-bottom direction can be detected from magnetic information in a cartridge film, or determined based on the exposed surface, the hue, and the like on the image in a 35-mm film and the like. For example, this automatic image edit device can process a film in which attribute information is optically recorded by printing on a portion outside a film frame and optically read in laying out photographic frames.

As a plurality of template layout areas, C type layout areas with a normal layout area size are exemplified in FIGS. 5A and 5B and 10A to 10D. However, the layout area size and the number of layout areas are not limited to them. If the H type template with the high-vision size, the P type template with the panorama size, and a template with a combination of the C, H, and P type patterns are registered as template pattern examples in an external memory device, the present invention can process all of them.

The automatic image edit device of this embodiment can be constituted as a high-precision, high-cost device usable in a laboratory which receives a print order from the user. At the same time, it can be constituted as a low-cost "printer with a layout function" for the photograph so as to allow the user to personally enjoy photograph image processing.

The image output device is assumed to be a color printer. As other functions, for example, the image output device can display an image on a monitor (or a TV set) by arranging a terminal capable of outputting a digital image signal, and output image data for PC card processing on a personal computer. Coupling to such a digital image data processing device is also within the spirit and scope of the present invention.

What is claimed is:

1. An image edit device comprising:
   image input means for reading an image optically recorded on a film;
   frame size input means for reading frame size information magnetically recorded on said film;
   top/bottom judgment means for judging top side and bottom side of the image optically recorded on said film; and
   layout means for laying out a plurality of images read by said image input means in one field having a plurality of layout areas by using the frame size information read by said frame size input means and the image top-bottom information judged by said top/bottom judgment means, said laying out being performed in accordance with layout information input by a user.

2. A device according to claim 1, wherein said layout means lays out the plurality of images in said one field so that blanks around the images laid out fall within a predetermined range.

3. A device according to claim 1, further comprising selection means for selecting the plurality of images to be laid out in said one field.

4. A device according to claim 1, further comprising a memory for storing image information read by said image input means and the frame size information read by said frame size input means.

5. A device according to claim 1, wherein said top/bottom judgment means judges the top side and bottom side of the image optically recorded on said film by reading the image top/bottom information magnetically recorded on said film.

6. A device according to claim 1, wherein said top/bottom judgment means judges the top side and bottom side of the image from a hue distribution tendency of the image read by said image input means.

7. A device according to claim 1, wherein said top/bottom judgement means judges the top side and bottom side of the image from a lightness distribution tendency of the image read by said image input means.

8. An image edit device comprising:
   image input means for reading an image optically recorded on a film;
   frame size input means for reading frame size information magnetically recorded on said film;
   top/bottom judgment means for judging top side and bottom side of the image optically recorded on said film; and
   layout means for laying out a plurality of images read by said input means in one field in accordance with a predetermined template, said layout means editing a layout conforming to said template on the basis of the frame size information read by said frame size input means and the image top/bottom information judged by said top/bottom judgment means, said laying out being performed in accordance with layout information input by a user.

9. A device according to claim 8, wherein said layout means changes an image magnification of enlargement so that blanks around the images laid out fall within a predetermined range.

10. A device according to claim 8, further comprising selection means for selecting the plurality of images to be laid out in said one field.

11. A device according to claim 8, further comprising a memory for storing image information read by said image input means and the frame size information read by said frame size input means.

12. A device according to claim 9, wherein said top/bottom judgment means judges the top side and bottom side of the image optically recorded on said film by reading the image top/bottom information magnetically recorded on said film.

13. A device according to claim 8, wherein said top/bottom judgement means judges the top side and bottom side of the image from a hue distribution tendency of the image read by said image input means.

14. A device according to claim 8, wherein said top/bottom judgement means judges the top side and bottom side of the image from a lightness distribution tendency of the image read by said image input means.

15. An image edit device for editing an image optically recorded on a film, comprising:
   frame size input means for reading frame size information magnetically recorded on said film;
   magnification determination means for determining an image magnification of enlargement on the basis of the frame size information read by said frame size input means;
   top/bottom judgment means for judging top side and bottom side of the image optically recorded on said film; and layout means for laying out, in one field, a plurality of images enlarged at the magnification of enlargement determined for each frame size by using the image top/bottom information judged by said top/bottom judgment means, said laying out being performed in accordance with layout information input by a user.

16. A device according to claim 15, further comprising selection means for selecting the plurality of images to be laid out in said one field.

17. A device according to claim 15, further comprising a memory for storing image information read by said image input means and the frame size information read by said frame size input means.

18. A device according to claim 15, wherein said layout means changes the image magnification of enlargement so that blanks around the images laid out fall within a predetermined range.

19. A device according to claim 15, wherein said top/bottom judgment means judges the top side and bottom side of the image optically recorded on said film by reading the image top/bottom information magnetically recorded on said film.

\* \* \* \* \*

UNITED STATES PATENT AND TRADEMARK OFFICE
CERTIFICATE OF CORRECTION

PATENT NO. : 6,169,544 B1  
DATED : January 2, 2001  
INVENTOR(S) : Hitoshi Onoda Page 1 of 1

It is certified that error appears in the above-identified patent and that said Letters Patent is hereby corrected as shown below:

<u>Column 4,</u>  
Line 60, delete "magnetic" and insert -- magnetically --.

Signed and Sealed this

First Day of January, 2002

Attest:

JAMES E. ROGAN  
*Director of the United States Patent and Trademark Office*

*Attesting Officer*